United States Patent
Audart-Noel et al.

(10) Patent No.: US 7,909,302 B2
(45) Date of Patent: Mar. 22, 2011

(54) TWO-SHACKLE AIRCRAFT ENGINE ATTACHMENT

(75) Inventors: Virginie Audart-Noel, Pujaudran (FR); Marc Canadas, Toulouse (FR)

(73) Assignee: Airbus France, Toulouse (FR)

( * ) Notice: Subject to any disclaimer, the term of this patent is extended or adjusted under 35 U.S.C. 154(b) by 233 days.

(21) Appl. No.: 12/067,298

(22) PCT Filed: Sep. 26, 2006

(86) PCT No.: PCT/EP2006/066728
§ 371 (c)(1), (2), (4) Date: Mar. 19, 2008

(87) PCT Pub. No.: WO2007/036515
PCT Pub. Date: Apr. 5, 2007

(65) Prior Publication Data
US 2008/0230675 A1 Sep. 25, 2008

(30) Foreign Application Priority Data
Sep. 28, 2005 (FR) ...................................... 05 52935

(51) Int. Cl.
*F16M 13/00* (2006.01)
(52) U.S. Cl. .......................................... 248/557; 244/54
(58) Field of Classification Search .................... 244/54, 244/131; 248/554, 557
See application file for complete search history.

(56) References Cited

U.S. PATENT DOCUMENTS

| | | | | |
|---|---|---|---|---|
| 4,786,202 A * | 11/1988 | Arnold et al. | ..................... | 403/79 |
| 5,320,307 A * | 6/1994 | Spofford et al. | ................. | 244/54 |
| 5,351,930 A * | 10/1994 | Gwinn et al. | ................. | 248/557 |
| 5,620,154 A * | 4/1997 | Hey | ................................. | 244/54 |
| 6,059,227 A * | 5/2000 | Le Blaye et al. | ................. | 244/54 |
| 6,173,919 B1 * | 1/2001 | Le Blaye | ......................... | 244/54 |
| 6,189,830 B1 * | 2/2001 | Schnelz et al. | ................... | 244/54 |
| 6,330,995 B1 * | 12/2001 | Mangeiga et al. | ............ | 248/554 |
| 6,843,449 B1 * | 1/2005 | Manteiga et al. | ................ | 244/54 |
| 6,988,692 B2 * | 1/2006 | Pasquer et al. | ................... | 244/54 |
| 7,165,743 B2 * | 1/2007 | Pasquer et al. | ................... | 244/54 |
| 2004/0251380 A1 * | 12/2004 | Pasquer et al. | ................... | 244/54 |
| 2004/0251381 A1 * | 12/2004 | Pasquer et al. | ................... | 244/54 |
| 2005/0067528 A1 * | 3/2005 | Loewenstein et al. | ........... | 244/54 |
| 2005/0269445 A1 * | 12/2005 | Chevalier et al. | ................ | 244/54 |
| 2007/0138337 A1 | 6/2007 | Audart-Noel et al. | | |

FOREIGN PATENT DOCUMENTS

| | | |
|---|---|---|
| EP | 0 997 653 | 5/2000 |
| EP | 1 231 138 | 8/2002 |
| EP | 1 281 615 | 2/2003 |
| EP | 1 481 896 | 12/2004 |
| EP | 1 535 838 | 6/2005 |

OTHER PUBLICATIONS

U.S. Appl No. 11/913,950, filed Nov. 9, 2007, Audart-Noel et al.

* cited by examiner

*Primary Examiner* — Terrell McKinnon
*Assistant Examiner* — Bradley H Duckworth
(74) *Attorney, Agent, or Firm* — Oblon, Spivak, McClelland, Maier & Neustadt, L.L.P.

(57) ABSTRACT

An aft attachment for an aircraft engine assembly. The attachment has a double boomerang structure including two three-point shackles that are duplicated: only four attachment points are present at the engine mount and two at the engine, the failsafe function being ensured by the dual structure. This attachment design does not sacrifice safety criteria, while providing a more lightweight structure.

15 Claims, 2 Drawing Sheets

TWO-SHACKLE AIRCRAFT ENGINE ATTACHMENT

TECHNICAL AREA

The present invention generally relates to the securing of an aircraft engine to a mounting pylon also called EMS for Engine Mounting Structure, used to suspend a turbojet engine below an aircraft wing for example, or to mount the turbojet engine above the wing.

The invention more particularly concerns a novel aft engine attachment comprising only two shackles and ensuring its intrinsic safety function, commonly called a failsafe function, via a duplicated structure.

STATE OF THE PRIOR ART

In aircraft, an engine mount is provided to form a connecting interface between an engine such as a turbojet engine and an aircraft wing. It allows the loads generated by its associated turbojet engine to be transmitted to the airframe, and also provides a path for fuel lines, air, electric and hydraulic systems . . . between the engine and the aircraft.

Therefore, as illustrated FIG. 1, an aircraft engine assembly 1 is intended to be fixed below a wing 2 of the aircraft, and comprises an engine such as a turbojet engine 3 extending along an axis AA, forwardly comprising the fan case 4 which delimits an annular fan duct, then the case enclosing the core of the turbojet engine and the exhaust case.

In the remainder of the description, by convention, the terms forward and aft refer to a direction of travel of the aircraft subsequent to the thrust exerted by the turbojet engine 3, this direction being schematically illustrated by arrow 5. By way of indication, it is noted that the assembly 1 is intended to be surrounded by a nacelle (not shown).

The engine assembly 1 also comprises an engine mount 6, a longitudinal element extending along a main direction parallel to axis AA, or slightly at an angle thereto. To ensure the transmission of loads, the engine mount 6 usually comprises a rigid structure, often of box type, i.e. comprising ribs formed of elements in the form of bars joined together by panels.

The rigid structure of the engine mount 6 carries a mounting system 7, 8, 9 used to secure the turbojet engine 3 thereto; this system comprises at least two engine attachments, generally at least one forward attachment 7 and at least one aft attachment 8; additionally, the mounting system comprises a thrust mount device 9 transferring thrust loads generated by the turbojet engine 3, for example in the form of two side thrust shackles joined firstly to an aft part of the fan case 4 of the turbojet engine 3, and secondly to an attachment point located between the forward attachment 7 and aft attachment 8. Another system of attachments (not shown) enables the suspending of this assembly 1 below the aircraft wing 2.

Conventionally, the aft engine attachment 8 allows transfer of the lateral, vertical and roll movements of the engine 3; also, safety requirements lay down the need for redundancy fastening devices. For example an aft attachment usually comprises a mounting beam, two three-point shackles and a two-point shackle: see for example document U.S. Pat. No. 6,330,995.

It appears, however, that the presence of the two-point shackle weighs down the device, weight being a permanent concern in the area of aeronautics, and the distance between engine mount and engine must remain within the dimensions limited by the design of engine assemblies.

DESCRIPTION OF THE INVENTION

The invention proposes a novel structure for the aft engine attachment on the engine mount of an aircraft, which can lighten the device whilst maintaining its failsafe properties.

According to one of its aspects, the invention therefore proposes an engine attachment comprising a first device, or beam, intended to be secured to the engine mount, and two three-point shackles i.e. triangular brackets. The beam comprises a clevis provided with two branches in a U-shape, between which each shackle can be inserted. Each branch of the clevis comprises four opposite-facing anchor orifices, preferably only four holes, aligned if possible, which correspond to two orifices of each shackle; each shackle also comprises a third anchor orifice intended to be secured to a clevis on the engine side. Advantageously, the triangle formed by the three orifices of each shackle is an isosceles triangle.

The mounting of the engine attachment comprises the use of shackle pins, preferably ball-jointed, so as to secure the two shackles by the four anchor points of the beam; two shackle pins, preferably duplicated, ball-jointed and with a radial clearance are used to secure the engine attachment to a clevis, also advantageously duplicated, of the engine.

According to the invention, each shackle is of dual structure and comprises two parts, advantageously of identical thickness, that are triangular and comprise the three adjacent anchor orifices, these parts lying adjacent i.e. side by side in the direction of the plane of mounting.

According to another aspect, the invention relates to an engine assembly in which the aft engine attachment consists of an attachment having a dual shackle structure according to the invention.

BRIEF DESCRIPTION OF THE DRAWINGS

The characteristics and advantages of the invention will be better understood on reading the following description with reference to the appended drawings which are in no way limiting and given solely for illustration purposes.

DETAILED DESCRIPTION OF PARTICULAR EMBODIMENTS

As is known, and to avoid having to modify the entire design of the engine assembly, the aft attachment of the invention is based on the principle of three-point securing onto the engine mount and two-point securing onto the engine for the transfer of vertical, lateral and roll loads of the engine; the attachment according to the invention is preferably of symmetric design.

Also, the modifications according to the invention are such that the failsafe properties of engine mounting are not deteriorated; in particular, any failure of one of the mounting elements remains offset by the presence of another element. The essential function of an engine mount for aircraft operation entails strict reliability criteria.

Figure 1:
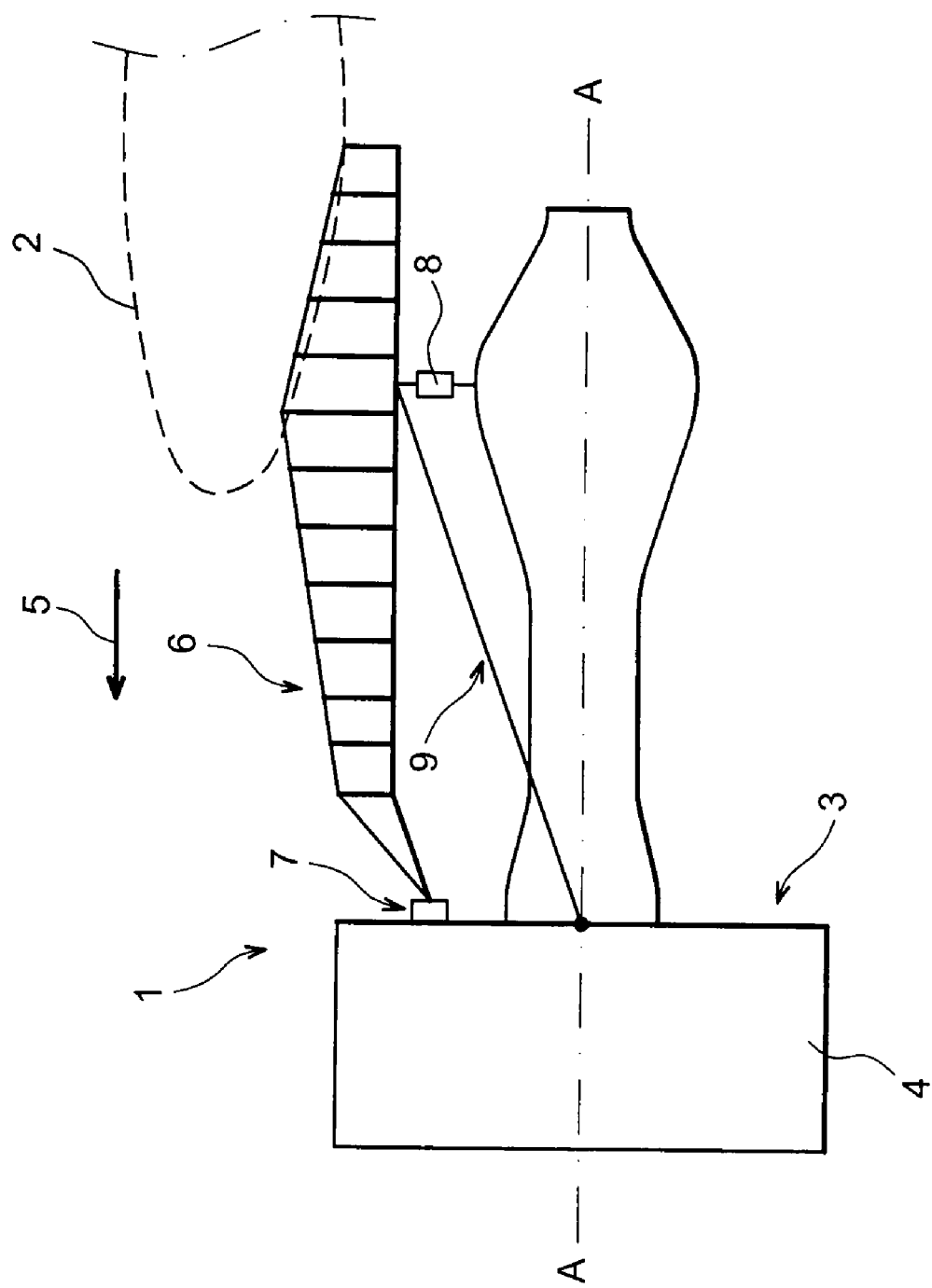
FIG. 1, already described, is a schematic side view of a partial aircraft engine assembly.
Figure 2:
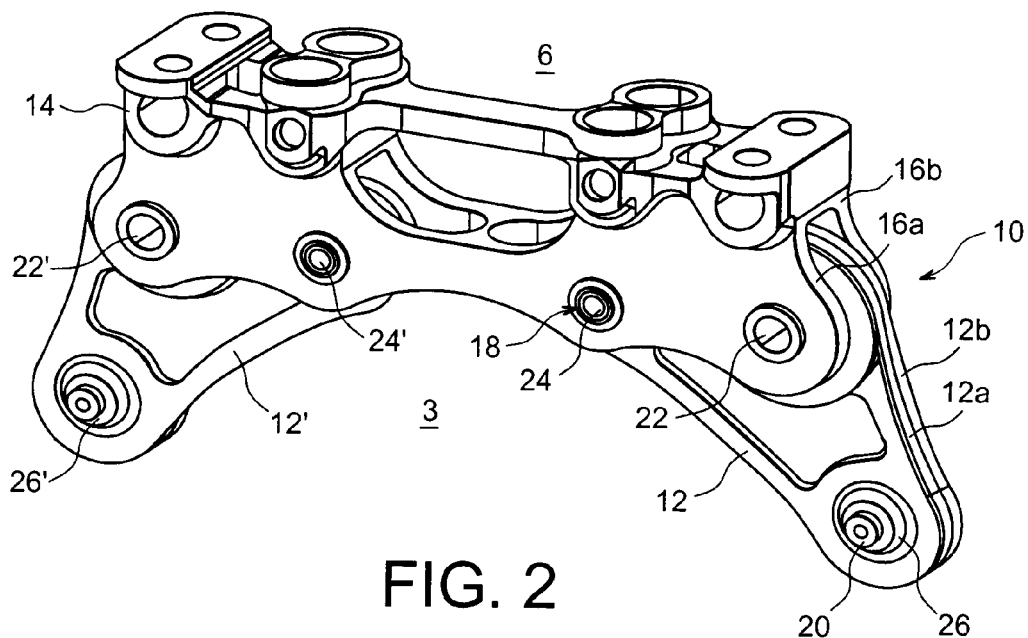
FIG. 2 shows an engine attachment according to one preferred embodiment of the invention.

As illustrated by FIG. 2, the attachment 10 of the invention is of double boomerang type, orthogonal, or near-orthogonal, to axis AA of the engine 3, i.e. it comprises two substantially triangular brackets 12, 12', or three-point shackles, defining a radial mounting plane lying substantially normal to axis AA. The shackles 12, 12' each allow mounting at one point on the side of the engine 3 and at two points on the side of the engine mount 6, no demand being placed on one of the four anchor points on the side of the engine mount 6 under normal conditions, this point being able to offset any failure of one of the three other points. Preferably, the two shackles 12, 12' are of similar type and shape, having mirror symmetry relative to a plane lying normal to the mounting plane and containing axis AA of the engine 3.

Mounting according to the invention is achieved via a beam 14 secured to the engine mount 6 or forming an integral part thereof, used to assembly the shackles. The beam 14 comprises a U-shaped clevis with two branches 16a, 16b between which the brackets 12, 12' can be inserted for fixing; preferably, the adjustment between the brackets 12, 12' and the distance between the branches 16a, 16b is determined by rotation of the shackles which must remain free to accommodate axial movements of the engine (due to thermal expansion for example). The beam 14 is of usual design: in particular, its shape, its dimensions, its composition are adapted and modelled as is known in relation to the engine 3, to the engine mount 6 and to the type of aircraft.

Securing between the beam 14 and shackles 12, 12' is achieved using pins 18 preferably ball-jointed pins, inserted in cooperating orifices of each of elements 12, 12', 16. Similarly, the shackles 12, 12' are coupled to devises (not illustrated) on the side of the engine 3 by link pins 20, possibly having a ball-joint shackle.

In the light of the configuration detailed above, each shackle 12, 12' therefore comprises three orifices located at the three corners of each triangle. The shackles 12, 12' therefore each comprise a first orifice 22 used for anchoring outside the beam 14; from this first orifice 22, a first arm is defined along the clevis 16 of the beam 14 towards a second anchor orifice 24 on the beam 14, and a second arm is directed away from the beam 14 towards a third orifice 26 which will be secured to a clevis of the engine 3. The length of the second arms is adapted to the distance between the engine 3 and the engine mount 6.

The beam 14 therefore comprises four opposite-facing orifices for the first 22, 22' and second 24, 24' anchor points. Preferably, the four anchor orifices of the beam 14 are aligned for isostatic reasons; these four anchor orifices are preferably the only orifices present on the branches 16a, 16b.

As is usual, in normal operation, the first shackle 12 and the second arm of the second shackle 12' function so that they transfer the vertical, lateral and roll loads of the engine 3: no demand is placed on one of the second orifices 24' which remains on standby, the five others carrying the full load; the orifice on standby 24' becomes engaged in the event of rupture of a securing pin 18, or in the event of failure of one of the branches of the clevis 16a, 16b of beam 14 at this point (the orifice on which no demand is placed can evidently also be a first orifice 22).

Also, according to the invention, each shackle 12, 12' has a dual structure design i.e. the bracket 12 is manufactured in two parts 12a, 12b lying adjacently along the radial mounting plane i.e. lying side by side; in fact the two parts 12a, 12b form two semi-shackles sized similarly to shackles 12, 12' except for their thickness, which is advantageously identical for each of the two parts. The securing together of the two semi-shackles 12a, 12b can be obtained by riveting or screwing for example; preferably however the clamping achieved by the securing pins 18, 20 (i.e. by the nuts of the ball joints housed in bores of the shackles—not schematised), and further at the branches 16a, 16b and engine clevises, ensures the absence of any relative movement between the two elements 12a, 12b, in which case the two parts of each shackle 12, 12' can lie side by side, with no other securing means.

Any rupture of a shackle 12, 12' is therefore covered by its redundancy: if one of the elements 12a, 12b encounters a problem, the other takes over the full load and can ensure the corresponding function. Sizing of the thickness of the semi-shackles 12a, 12b is evidently appropriate.

Similarly, it is preferable for the devises on the engine side, not illustrated, also to be duplicated, to offset any rupture thereof.

Finally, according to the invention, at the third orifices 26, 26', provision is also made for the securing pins 20 to be duplicated, to cover any failure thereof.

Figure 3A:
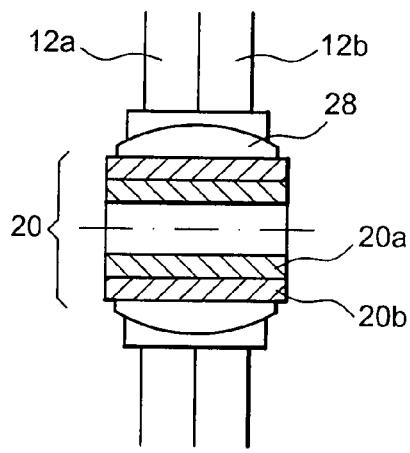
FIGS. 3A and 3B illustrate link pins of an engine attachment according to the invention.

There are two possible configurations for the duplicated link pins 20: according to the first option, similarly to the dual structure of the shackles 12, 12' previously described, the shackle pin 20 is formed of two cylindrical layers 20a, 20b functioning without any clearance, as illustrated FIG. 3A. Advantageously, only the link pin 20 is duplicated; a simple ball joint 28 for example can be located in an adapted cage. It is to be noted that this configuration, when calculating dimensions, requires giving consideration to the fact that each part 20a, 20b of the pin 20 works and bears a fatigue load under normal operating conditions.

Figure 3B:
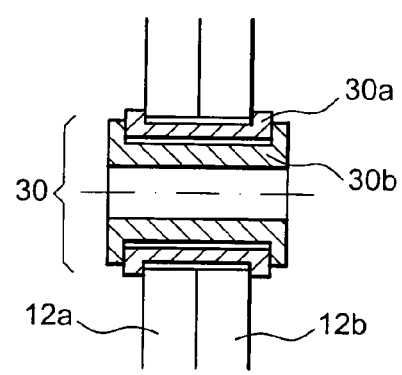

Another option is illustrated FIG. 3B, in which the ball joint is not shown. The pin 30 has a configuration with radial clearance between the two parts 30a, 30b of the pin, which means that only the outer pin 30b works under normal operation. However, clamping means prevent any axial play between the two parts. Here again the pins 30 are sized to accommodate the loads to be carried.

In addition to the above-mentioned advantages, it is to be noted that the configuration according to the invention can accommodate a substantial height between the mounting points 22, 26 and hence a greater distance between engine 3 and engine mount 6 than currently existing attachments. Additionally, the number of parts in the attachment 10 is limited with a related weight gain.

Also, by eliminating the fifth anchor point at the engine mount 6, it is possible to modify the distances between the first and second orifices more freely. For a three-point shackle 12, optimal load distribution is obtained with a distance between orifices 22, 24 of the first arm that is identical to the distance between orifices 22, 26 of the opposite arm, i.e. with an isosceles triangles formed by the three orifices. By means of the configuration according to the invention, it is possible to space orifices 22, 24 of the first arm in relation to the engine mount/engine distance (i.e. in relation to the imposed size of the second arm) in order to reach this objective.

These additional advantages are obtained without any decrease in safety, since any rupture of the engine devises, engine pins and shackles are covered by their redundancy, and any failure of beam pins and beam clevises is covered by engagement of the standby pin, the transfer of loads between the shackles also being very clean.

The invention claimed is:

1. An aircraft engine attachment configured to be positioned between an engine and a mount for the engine, the attachment comprising:

a first securing device configured to be secured to the engine mount and including two branches, four anchor orifices of one branch facing four anchor orifices of an other branch; and two shackles each including three orifices, two of the orifices of each shackle connected by link pins to the first securing device via respective anchor orifices at a position in between the two branches, and the third orifice of the shackle configured to be secured at an engine clevis, wherein each of the shackles is a structure including two parts of identical shape and identical thickness lying directly adjacent to and contacting one another in a direction orthogonal to a line connecting the four orifices of the one branch, and wherein upon rupture of one of the two parts of identical shape, an other of the two parts of identical shape lying directly adjacent to and contacting the one of the two parts assumes a full load of the shackle.

2. The attachment according to claim 1, wherein each branch of the first securing device only has four orifices.

3. The attachment according to claim 2, wherein the four orifices of each branch of the first securing device are aligned with each other.

4. The attachment according to claim 1, wherein a triangle formed by the three orifices of each shackle is an isosceles triangle.

5. The attachment according to claim 1, further comprising four link pins securing the two shackles between the branches of the first device.

6. The attachment according to claim 1, further comprising link pins cooperating with the third orifices.

7. The attachment according to claim 6, wherein the link pins cooperating with the third orifices have a structure including a first part disposed within a second part having a larger diameter.

8. The attachment according to claim 7, wherein the link pins of dual structure have a radial clearance between the two parts.

9. The attachment according to claim 5, wherein the link pins are ball-jointed.

10. An aircraft engine assembly comprising:
an engine mount; and
an engine secured to the mount via an aft attachment according to claim 5.

11. The engine assembly according to claim 10, wherein the aft attachment is secured to the engine via duplicated clevises.

12. The engine assembly according to claim 10, wherein the engine connects to the attachment only at a location of the third orifices of the shackles.

13. The engine assembly according to claim 10, wherein in normal operation of the engine assembly, the shackles are configured to transfer the vertical, lateral and roll loads of the engine.

14. The engine assembly according to claim 10, wherein in normal operation of the engine assembly, no load is placed on one pair of orifices facing each other of the first securing device such that the remaining five orifices carry a full load of the engine.

15. The engine assembly according to claim 10, wherein the shackles each allow mounting at one point on a side of the engine and at two points on a side of the engine mount.

* * * * *